Patented Feb. 25, 1930

1,748,429

UNITED STATES PATENT OFFICE

FRANCIS GEORGE COAD STEPHENS, LENNOX JAMES ANDERSON, AND WILLIAM ALAN CASH, OF LONDON, ENGLAND, ASSIGNORS TO NATIONAL METAL AND CHEMICAL BANK LIMITED, OF LONDON, ENGLAND

MANUFACTURE OF TITANIUM-CONTAINING COMPOUNDS

No Drawing. Application filed April 4, 1929, Serial No. 352,595, and in Great Britain October 1, 1927.

This invention relates to improvements in the manufacture of titanium containing compounds particularly titanium oxide or hydrate and compositions containing titanium oxide or hydrate associated with an insoluble sulphate, with or without other constituents such as borates, for use especially as pigments.

Titanium containing pigments consisting essentially of titanium oxide and an alkaline earth sulphate such as barium sulphate are well known, one method of manufacturing the same being to add a soluble barium salt solution to a solution of titanium sulphate, the latter if resulting from the treatment of ilmenite with sulphuric acid usually containing also some ferrous sulphate. By heating or boiling the mass at suitable dilution the titanium in the titanium salt resulting from the double decomposition is precipitated as the hydrated titanium oxide and it is usually considered that the hydrated titanium oxide particles become intimately associated with the barium sulphate by external adherence of the said particles onto the barium sulphate.

According to the present invention a suitable titanium salt solution is hydrolyzed by adding the same in a hot or cold condition to warm or boiling water to which has previously been added a substance or substances other than colloidal titanium oxide adapted to ensure the desired physical condition of the hydrated titanium oxide particles formed in the liquid. The desired physical condition of the precipitated particles is a condition in which they are filterable but not so coarse as to detrimentally affect their properties as a pigment, the substances found suitable being certain substances usually termed colloids particularly silicic acid. The hot or boiling temperature is maintained until the titanium is for the most part converted into the hydrated titanium oxide condition.

The titanium salt solution may be prepared directly by dissolving a titanium compound in acid or it may be the liquid component of double decomposition, such as above mentioned.

The precipitated titanium oxide may be eventually used alone as a pigment (after being washed, neutralized and calcined) or it may first be associated with other substances.

The titanium salt solution prepared or derived from any suitable source, preferably contains about 5 per cent of the total titanium present in the titanous condition. In the case of obtaining the solution by treatment of titanium ore such as ilmenite with sulphuric acid or oleum the greater part of the ferrous sulphate resulting from the iron in the ore is preferably separated out by crystallization. The titanium sulphate in solution is then hydrolyzed as above described and the resultant hydrated titanium oxide may be filtered and washed free from iron and neutralized and calcined after which it is ready for use as a pigment. If desired a borate may be incorporated with the hydrated oxide as already indicated. Alternatively the filtered and washed hydrated titanium oxide may be associated with an alkaline earth sulphate in an appropriate manner as for example by preparing precipitated barium sulphate and mixing it with the hydrated titanium oxide, neutralizing the mixture, treating it with borate if desired and calcining the mixture; or the hydrated titanium oxide may be washed free from iron, treated with borate if desired and then mixed with the alkaline earth sulphate, the mixture being neutralized and then dried and calcined in the usual way.

Another method of associating the hydrated titanium oxide with an alkaline earth sulphate is to take the hydrated titanium oxide formed as above described by the hydrolysis of titanium sulphate and to mix it—while still in suspension in the hydrolysis liquor—with a solution of an alkaline earth salt preferably barium chloride; or again the hydrated titanium oxide may be washed free from iron, mixed with a soluble sulphate solution such as for example sodium sulphate, the insoluble alkaline earth sulphate being then precipitated by admixture with a solution of an alkaline earth salt such as barium chloride, the mixed precipitate being filtered, treated with borate if desired, neutralized and calcined in the usual way.

In each case if desired, the alkaline earth sulphate is prepared from hot or cold solutions, but we find that when the solutions are cold the resulting pigment is less easily handled.

What we claim is:—

1. In the production of titanium oxide or compositions containing same for use as a pigment, the step of adding to water silicic acid, and then adding a titanium salt solution to such water in a heated condition whereby the salt becomes hydrolyzed.

2. In the production of titanium oxide or compositions containing same for use as a pigment, the step of adding to water silicic acid, then adding titanium sulphate solution to such water in a heated condition and finally adding barium chloride to the hydrolysis liquor.

3. The production of hydrated titanium oxide associated with an insoluble alkaline earth sulphate consisting in adding a titanium sulphate solution to water in a heated condition containing silicic acid, and adding to the resultant hydrated titanium oxide while still in suspension in the hydrolysis liquor a solution of an alkaline earth salt.

In testimony whereof we have signed our names to this specification.

FRANCIS GEORGE COAD STEPHENS.
LENNOX JAMES ANDERSON.
WILLIAM ALAN CASH.